US009105043B2

(12) United States Patent
Richard

(10) Patent No.: US 9,105,043 B2
(45) Date of Patent: Aug. 11, 2015

(54) METHOD AND SYSTEM FOR PROVIDING INCENTIVES TO MEMBERS OF A SOCIAL NETWORK

(76) Inventor: Postrel Richard, Miami Beach, FL (US)

( * ) Notice: Subject to any disclaimer, the term of this patent is extended or adjusted under 35 U.S.C. 154(b) by 460 days.

(21) Appl. No.: 13/413,416

(22) Filed: Mar. 6, 2012

(65) Prior Publication Data

US 2013/0238416 A1    Sep. 12, 2013

(51) Int. Cl.
*G06Q 30/00* (2012.01)
*G06Q 30/02* (2012.01)
*G06Q 50/00* (2012.01)

(52) U.S. Cl.
CPC ........ *G06Q 30/0224* (2013.01); *G06Q 30/0236* (2013.01); *G06Q 50/01* (2013.01)

(58) Field of Classification Search
CPC .................................................. G06Q 30/0236
USPC ...................................................... 705/14.36
See application file for complete search history.

(56) References Cited

U.S. PATENT DOCUMENTS

| | | | |
|---|---|---|---|
| 2006/0042483 A1* | 3/2006 | Work et al. | 101/91 |
| 2008/0182563 A1* | 7/2008 | Wugofski et al. | 455/414.2 |
| 2009/0018916 A1 | 1/2009 | Seven et al. | |
| 2009/0132365 A1 | 5/2009 | Gruenhagen et al. | |
| 2009/0222348 A1 | 9/2009 | Ransom et al. | |
| 2010/0312649 A1* | 12/2010 | Lurie | 705/14.66 |
| 2011/0022455 A1 | 1/2011 | Wolf et al. | |
| 2011/0258049 A1 | 10/2011 | Ramer et al. | |
| 2012/0101883 A1 | 4/2012 | Akhter et al. | |
| 2012/0239467 A1 | 9/2012 | Winters et al. | |

OTHER PUBLICATIONS

"Gilt Picks Your Next Discount Amount Based on Your Klout Score", http://mashable.com/2012/03/05/gilt-discount-klout-score, downloaded from Internet Mar. 8, 2012.
International Search Report and Written Opinion of the ISA for PCT/US13/29252, May 20, 2013.

\* cited by examiner

*Primary Examiner* — John G Weiss
*Assistant Examiner* — Scott C Anderson
(74) *Attorney, Agent, or Firm* — Barkume & Associates, P.C.

(57) ABSTRACT

A social network server computer forms a social network including a primary member linked to a plurality of secondary members, each of whom provides a member profile. A network profile is generated based on an analysis of the member profiles. A social network server computer then determines a relative value of the social network with respect to a merchant by analyzing the associated network profile, and offers a merchant incentive to the primary member of the network as a function of the determined relative value. In a second embodiment, a merchant computer associated with a merchant determines a relative value of the social network with respect to a merchant by analyzing the network profile, and offers a merchant incentive to the primary member of the network as a function of the determined relative value. The merchant incentives may be also offered to the secondary members of the associated social network.

18 Claims, 3 Drawing Sheets

METHOD AND SYSTEM FOR PROVIDING INCENTIVES TO MEMBERS OF A SOCIAL NETWORK

TECHNICAL FIELD

This invention relates to reward and incentives systems, and in particular to a method and system for generating incentives based on an aggregate analysis of the members of a social network and providing those incentives to the members for use at participating merchants.

BACKGROUND OF THE INVENTION

Social networking is a paradigm in which groups of members are defined wherein the members interact with each other in desired ways. Typically members of a social network communicate electronically via a social networking service such as FACEBOOK or TWITTER. Members may share images and videos, and may have interactive chat sessions with messaging to select members of their social network.

Since members of social networks often have common interests and socioeconomic status, it is desired to be able to utilize the vast amounts of information available from those members in order to market various products and services. Social networking services that are currently implemented often gather information from their members in a surreptitious manner whereby the members do not even know that their information is being used, or that their activities are being tracked, etc. It is therefore desired to be able to obtain information about the members on a voluntary basis. To do this, it is desired to provide members of social networks with incentives for providing their information and allowing use of that information on a voluntary basis.

SUMMARY OF THE INVENTION

Provided is method of and system for operating a rewards-based social network. A social network server computer forms a social network that includes a plurality of members, which include a primary member linked to a plurality of secondary members. Each of the members of the social network registers with the social network server computer and provides a member profile that has information associated with the member. The social network server computer generates a network profile based on an analysis of the member profiles. In a first embodiment, the social network server computer then determines a relative value of the social network with respect to a merchant by analyzing the associated network profile, and offers a merchant incentive to the primary member of the network as a function of the determined relative value of the associated social network. In a second embodiment, a merchant computer associated with a merchant determines a relative value of the social network with respect to the merchant by analyzing the network profile, and offers a merchant incentive to the primary member of the network as a function of the determined relative value of the associated social network. In either case, the merchant incentives may be also offered to the secondary members of the associated social network. The social network may be formed by integrating with an existing social network such as FACEBOOK or TWITTER. Each of the member profiles may have personal information of the member such as but not limited to income, age, location, occupation, shopping habits, and/or prior transaction history. In addition, each of the member profiles may include information on reward programs with which the member is affiliated. The network profile may be based on an average of the member profiles, an aggregate of the member profiles, and/or a comparison with profiles of non-members of the social network. Optionally, the relative value of the network may be determined with respect to a merchant by analyzing the network profile and a merchant profile associated with the merchant.

The network profile may be provided to a third party in exchange for compensation from the third party, and at least a portion of that compensation may then be paid to the primary member of the social network in exchange for use of the network profile. Further optionally, at least another portion of the compensation may be paid to one or more secondary members of the social network in exchange for use of the network profile.

DESCRIPTION OF THE PREFERRED EMBODIMENTS

Figure 1:
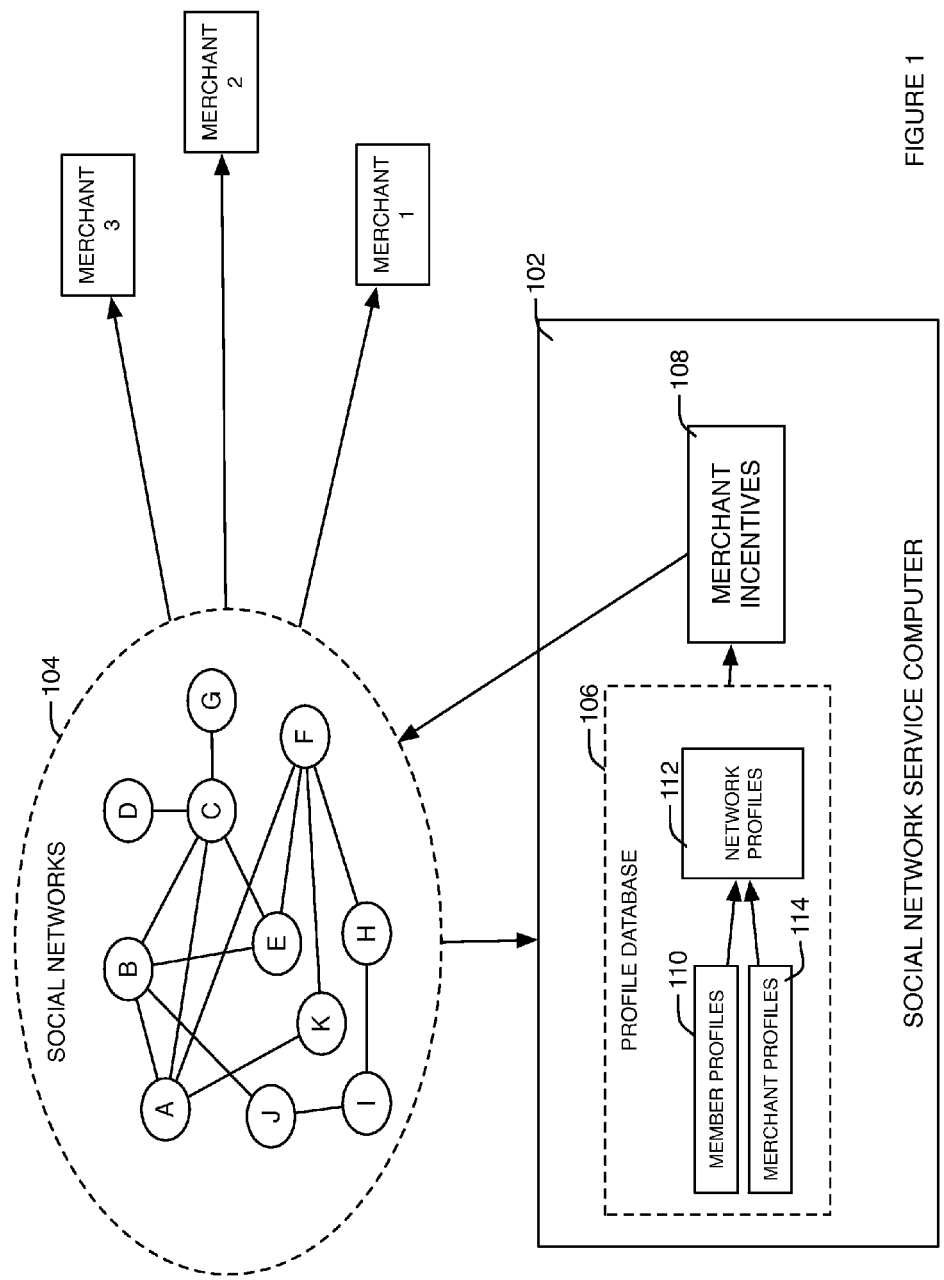
FIG. 1 is a block diagram of a first preferred embodiment of the invention.

The preferred embodiments of the present invention will now be described with respect to the drawing figures. FIG. 1 is a block diagram of a first preferred embodiment of the invention. Interrelated social networks 104 are shown with various members A, B, C, D, E, F, G, H, I, J and K. Only eleven members are shown for illustrative purposes, although it is contemplated that the number of members that may be part of the social networks 104 is essentially unlimited. Social networks are constructs as well known the art that provide a communication paradigm amongst its various members. Social networks are groups of persons that interact with each other in some format(s), typically over an electronic communications network such as the Internet. Various social networking services exist, which facilitate interactions amongst the various constituent members that form the social networks. Examples of well-known existing social networking services include FACEBOOK, TWITTER, MYSPACE, AND GOOGLE+. These services enable its members to define various social networks in which the members choose to link with (or friend) each other to share information, images, videos, emails, chat, etc. In this embodiment, the members A, B, C, D, E, F, G, H, I, J and K shown within the dotted oval of FIG. 1 are all registered with the same social network server computer 102 but form different social networks as follows:

social network A: A-B-C-F-K
social network B: B-A-J-E-C
social network C: C-A-B-D-G-E
social network D: D-C
social network E: E-B-C-F
social network F: F-A-E-K-H
social network G: G-C
social network H: H-F-I
social network I: I-J-H
social network J: J-B-I
social network K: K-A-F That is, member A has linked to members B, C, F and K to form the social network A. Similarly, member B has linked to members A, J, E and C to form the social network B, and so forth. Any information that A chooses to share in his social network A will be received by B, C, F and K. Similarly, any information that B chooses to share in his social network B will be received by A, J, E and C, and so forth. Member A is considered to be the primary member of social network A since he is the common link. Similarly, member B is considered to be the primary member of the social network B since he is the common link. Any member of a social network who is not the primary member of that social network is considered to be a secondary member of that network. Each member of the social networking service will be a primary member to one social network (defined by the secondary members to whom he has linked), and each member is a secondary member to the social networks of those in his social network. Thus, member A is a secondary member to social networks B, C, F and K. Even though E is linked to B, E will not receive information received by B from A since E is not linked to A directly. The term social network 104 is used herein to refer to any of the social networks as described above.

Figure 3:
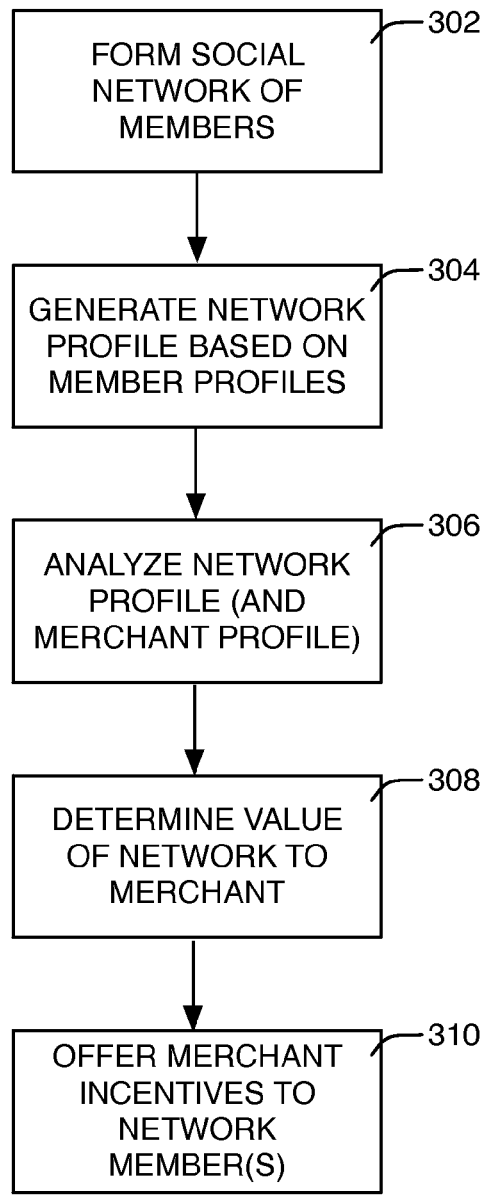
FIG. 3 is a flowchart of the operation of the preferred embodiments of the invention.

At step 302 in the flowchart of FIG. 3, the social network 104 may be formed amongst its various members utilizing the social network server computer 102 which runs the social networking service. The members of the social network 104 communicate with the social network server computer 102 by using various member computers (not shown), which may be desktop computers, laptop computers, tablets, smartphones, etc. These member computers communicate with the social network server computer 102 through a wired and/or wireless communications network(s) such as the Internet. Typically, each member will register or enroll with the social network server computer 102 and indicate their desire to join a particular social network 104 by linking with at least one of the constituent members of that social network. Any member may invite any other member to join his network, typically by an email message as known in the art. For example, member A has requested members B, C, F and K to link to him, which they have all accepted. Non-members may join the network if desired based on parameters established by the social networking service. As the various members register with the social network server computer 102 and then link with each other, they will be able to interact with each other in various ways, including but not limited to the interactions that will be described herein. Formation of social networks utilizing social network server computers and services is well known in the art.

In addition, members may invite other members of the social networking service, as well as non-members of the service, by issuing a broadcast invitation to groups of member and/or non-members as desired. This may occur over any type of medium, including but not limited to television or radio broadcasts, mass mail and email, etc. Invitees may accept the invitation to join the member's social network and register with the network. As part of the registration process, each member will provide to the social network server computer 102 a member profile 110 that will be stored in the profile database 106 as shown in FIG. 1. The member profile 110 will include various pieces of information that are associated with the member, including but not limited to personal information of the member such as income, age, location, occupation, shopping habits, and/or prior transaction history. Prior transaction history could include purchase transactions and the like. Additionally, the member profile 110 may include a listing of the reward/loyalty/incentive programs with which the member is registered.

At step 304, the social network server 102 computer generates a network profile 112 for each of the various social networks. Thus, the social network server computer 102 will generate network profile A for social network A, which will be based on the member profiles for members A, B, C, F and K. Similarly, the social network server computer 102 will generate network profile B for social network B, which will be based on the member profiles for members B, A, J, E, and C, and so forth. The term network profile 112 is used herein to refer to any of the network profiles as described above. As such, each member will have an associated network profile 112 that is based on the members in his own social network.

Each network profile 112 is based on an analysis of the constituent member profiles 110, and is stored in the profile database 106. The network profile is intended to be reflective of the information found in each of the constituent member profiles, and will subsequently be used in order to generate merchant incentives 108. The network profile 112 may be generated in one or more of various manners.

In one embodiment, the network profile 112 may reflect an average profile of all of the constituent member profiles. Averages may easily be generated for numerical data types; for example, the network profile may contain the average member age, the average income level, average household size, average number of years married, average height, average weight, average family size, etc. Data types that are not numerical may be analyzed to provide a quasi-average indication as well. For example, if most members live in the northeast region of the United States but a few live in the south region, then the network profile for those members may simply indicate that the average member lives in the northeast region.

Additionally (or in the alternative), the network profile 112 may reflect an aggregate profile of all of the constituent member profiles. For example, the network profile may indicate that 55% of the members are male and 45% are female, or it may indicate that 65% are adults and 35% are teenagers, or it may indicate that 4,657 of the 5,550 members graduated from college and the rest did not, or it may indicate that approximately half the members live inside the United States and half live outside the United States, etc.

Additionally (or in the alternative), the network profile 112 may reflect a comparison of its constituent members with non-members of that social network. For example, the network profile A for social network A may indicate that 80% of its constituent members A, B, C, F and K work in the professional services industry compared to only 16% of the non-members of social network A (D, E, G, H, I, J, and/or non-members of the social networking service).

Other mechanisms for generating a network profile that is in some way representative of some or all of the constituent member profiles is also contemplated by this invention.

Figure 2:
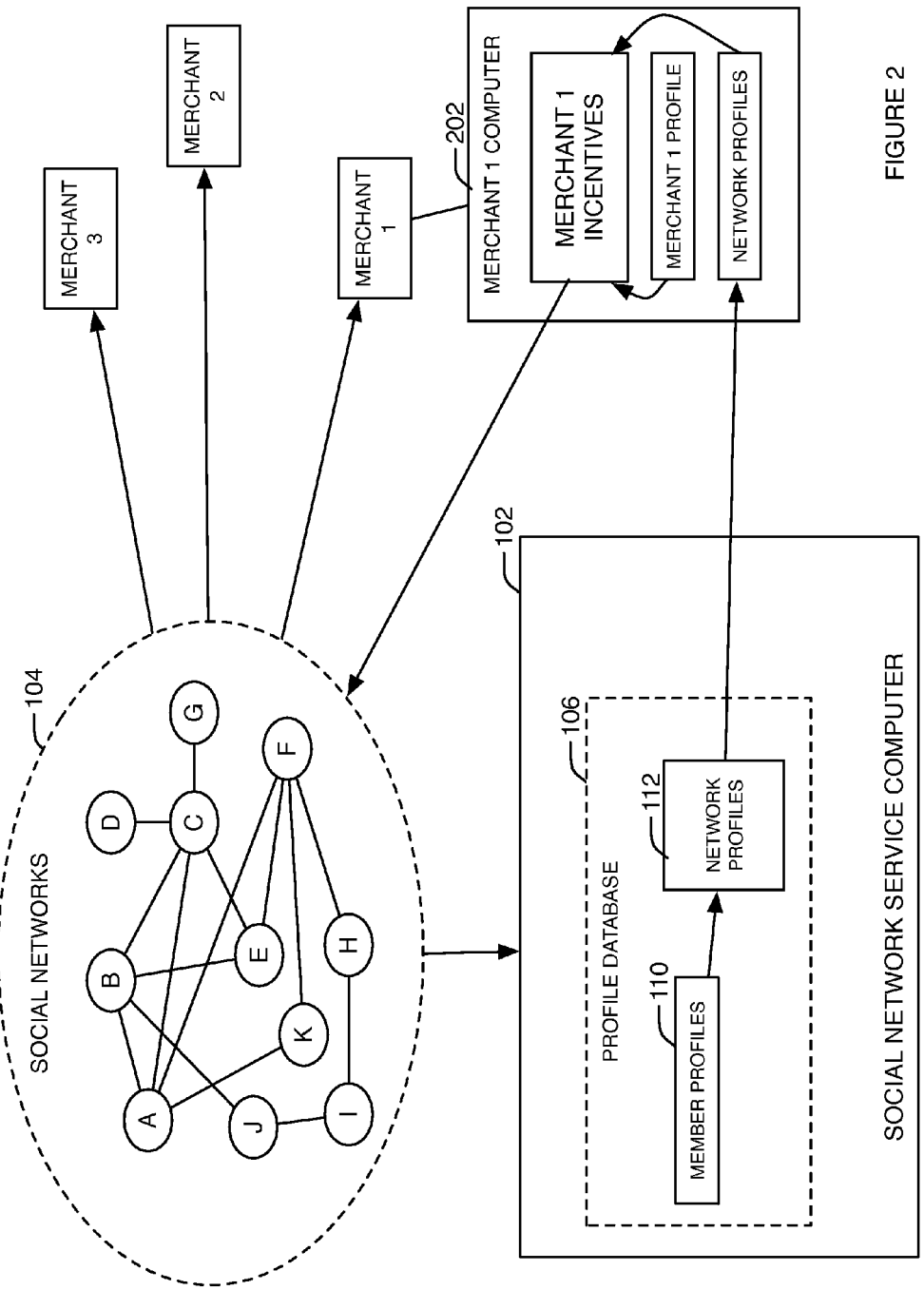
FIG. 2 is a block diagram of a second preferred embodiment of the invention.

After the network profile 112 has been generated at step 304, it is analyzed at step 306 in order to be able to determine the value of the constituent members of the social network in the aggregate to a merchant who participates in the program. In this first embodiment as shown in FIG. 1, this network profile analysis is performed by the social network server computer 102. In a second embodiment described below, the analysis is performed by an individual merchant computer 202 as shown in FIG. 2.

The network profile 112 is analyzed (by either the social network server computer 102 or the merchant computer(s) 202, as may be applicable) in order to determine the constituent members' value to the merchant(s) and generate merchant incentives for distribution to the members of the social network. That is, by analyzing the properties of a network profile (and thus the properties of the associated social network), incentives may be generated that will drive traffic to the participating merchants in a meaningful way. Rather than attempting to target each individual network member as in prior art marketing and incentive campaigns, this invention allows marketing to the social network members in the aggregate. Since members of the social network 104 share common interests that are defined by the social network itself, this leads to an intelligent incentive generation hereto unattainable in the prior art.

This also provides an incentive for the members of that social network to provide their data in their profiles and to allow usage of their data. For example, a network profile may indicate that members of the associated social network have an average age of 27 years old and are generally interested in photography. This intelligence may be used by the merchants to generate an appropriate merchant incentive such as a coupon for a discounted camera lens. If a given member of this social network has not previously indicated in his member profile an interest in photography but has interests related to photography such that he has joined this social network for other reasons (e.g. an interest in art), this member will receive the lens coupon by virtue of his membership in the social network. Without this methodology, this member would not have been targeted for this incentive since he has not shown an interest in photography, but his membership in the social network for other closely related reasons enables him to receive the incentive. That is, this member has value to the merchant that sells the lens because of his association with the social network 104. This is just an example as to how this information may be utilized.

At step 310, the merchant incentives that are generated as a function of the member profiles are distributed by the social network server computer 102 to the members of the social network 102. This may be done in various ways, including electronic downloads, email, text message, etc. The social network members may then use them at the various merchants as desired.

In the methodology described above, all constituent members of a social network (i.e. the primary member and all secondary members) would receive the merchant incentives that are generated by the social network server computer 102 for that social network. For example, merchant incentives that are generated for social network A (by using the network profile A) would be distributed to all members of social network A (i.e. A, B, C, F, and K). A corollary to this is that member A would receive merchant incentives that are generated using network profiles A, B, C, F and K, since he is a primary member of social network A and a secondary member of social networks B, C, F and K (since he is linked to those members).

In another embodiment, merchant incentives that are generated based on a given social network will only be distributed to the primary member of that social network. Thus, merchant incentives generated based on network profile A would be distributed only to primary member A, merchant incentives generated based on network profile B would be distributed only to primary member B, an so forth. In one example, the merchant incentive may increase in value as the number of secondary members of a given social network increases. This benefits the merchant since it can collect data from many more members. This provides an incentive for members to invite many other members to join his social network since it would result in incentives having an increased value.

Optionally, a merchant profile(s) 114 may be used by the social network server computer 102 in addition to the network profile 112 in order to generate the merchant incentives 108. The merchant profiles 114 are associated with the various participating merchants and contain information about the merchant that may be useful in generating the merchant incentives. The merchant profiles may 114 for example contain guidelines and instructions to be used by the social network server computer 102, such as an instruction to generate incentives when the network profile indicates a certain age demographic, or income level, etc. As such, the merchants have a level of control over the incentive generation process carried out by the social network server computer 102.

In an alternative embodiment as shown in FIG. 2, the merchant computer(s) 202 execute the task of incentive generation rather than the social network server computer 102. In this embodiment, the processing is distributed amongst the merchants so that each merchant controls on an individual basis the incentive generation. The social network server computer 102 will generate the network profiles and provide them to each participating merchant. Each merchant will then use the network profiles, along with a merchant profile internally stored on its merchant computer 202, in order to generate its own merchant incentives. These merchant incentives may then be distributed directly by the merchant computer 202 to the members of the social network (primary and secondary or primary only), or alternatively they may be provided to the social network server computer so it may distribute the incentives as in the first embodiment of FIG. 1.

In another embodiment of this invention, members of a social network may be compensated for use of their data based upon parameters of the social network as provided through the network profile. As the network profile is generated, that information (and/or the information from the constituent member profiles) may be provided to third party services such that revenue is generated and received by the social networking service as consideration for use of that information. This would be done after being given permission by the members for use of their information, whether individually (use by a third party of their own member profile) or in the aggregate (use by the third party of their information in the network profile). The member would then share in the compensation revenue received by the social networking service from the third party. In one case, revenue may be shared with only the primary member of the social network for use of the information from all of the members of his social network. In another case, revenue may be shared with the primary member of the social network and the secondary members of his social network for use of the information from all of the members of his social network.

Third parties that may obtain member information from the various social networks via the social network server computer include merchants, rewards issuers, payment processors, and the like. Each of these third parties may have different uses for the information, but all would desire this information and as a result are willing to provide compensation to the member(s) for use of that information.

What is claimed is:

1. A method of operating a social network comprising a social network server computer forming a social network comprising a plurality of members comprising a primary member linked to a plurality of secondary members, each of said members registering with said social network server computer and providing a member profile, each of said member profiles comprising information associated with said member;

the social network server computer generating a network profile associated with the primary member, based on an analysis of the member profiles;

the social network server computer receiving permission from each of the plurality of members for the social network server computer to provide the network profile to a third party;

only after receiving the permission from each of the plurality of members, then the social network server computer providing the network profile to a third party;

the social network server computer receiving revenue from the third party in exchange for use of the network profile; and the social network server computer paying at least a portion of the revenue received from the third party to the primary member of the social network in exchange for use of the network profile.

2. The method of claim 1 wherein the step of forming a social network comprises integrating with an existing social network of members.

3. The method of claim 1 wherein each of the member profiles comprises personal information of the member.

4. The method of claim 1 wherein each of the member profiles comprises information on reward programs with which the member is affiliated.

5. The method of claim 1 wherein the network profile is based on an average of the member profiles.

6. The method of claim 1 wherein the network profile is based on an aggregate of the member profiles.

7. The method of claim 1 wherein the network profile is based on a comparison with profiles of non-members of the network.

8. The method of claim 1 further comprising the social network server computer paying at least another portion of the revenue received from the third party at least one secondary member of the social network in exchange for use of the network profile.

9. The method of claim 1 wherein the step of forming, using a social network server computer, a social network comprising a plurality of members comprising a primary member linked to a plurality of secondary members, comprises broadcasting to a multiplicity of invitees an invitation to join the social network.

10. A system for operating a social network comprising:
a social network server computer comprising:
a profile database comprising a plurality of member profiles, each of the member profiles comprising information associated with a member;
processing circuitry programmed to:
form a social network comprising a plurality of members comprising a primary member linked to a plurality of secondary members, each of said members registering with said social network server computer and providing the associated member profile,
generate a network profile associated with the primary member, based on an analysis of the member profiles,
receive permission from each of the plurality of members for the social network server computer to provide the network profile to a third party;
provide, only after receiving the permission from each of the plurality of members, the network profile to the third party;
receive revenue from the third party in exchange for use of the network profile; and
pay at least a portion of the revenue received from the third party to the primary member of the social network in exchange for use of the network profile.

11. The system of claim 10 wherein the processing circuitry of the social network server computer is programmed to form a social network with an existing social network of members.

12. The system of claim 10 wherein each of the member profiles comprises personal information of the member.

13. The system of claim 10 wherein each of the member profiles comprises information on reward programs with which the member is affiliated.

14. The system of claim 10 wherein the network profile is based on an average of the member profiles.

15. The system of claim 10 wherein the network profile is based on an aggregate of the member profiles.

16. The system of claim 10 wherein the network profile is based on a comparison with profiles of non-members of the network.

17. The system of claim 10 wherein the processing circuitry of the social network server computer is further programmed to pay at least another portion of the revenue received from the third party to at least one secondary member of the social network in exchange for use of the network profile.

18. The system of claim 10 wherein the processing circuitry is programmed to form a social network comprising a plurality of members comprising a primary member linked to a plurality of secondary members by broadcasting to a multiplicity of invitees an invitation to join the social network.

* * * * *